April 12, 1955 W. W. P. STELTER 2,705,960
SELF FEEDER FOR CORN SHREDDERS
Filed May 19, 1950 4 Sheets-Sheet 1
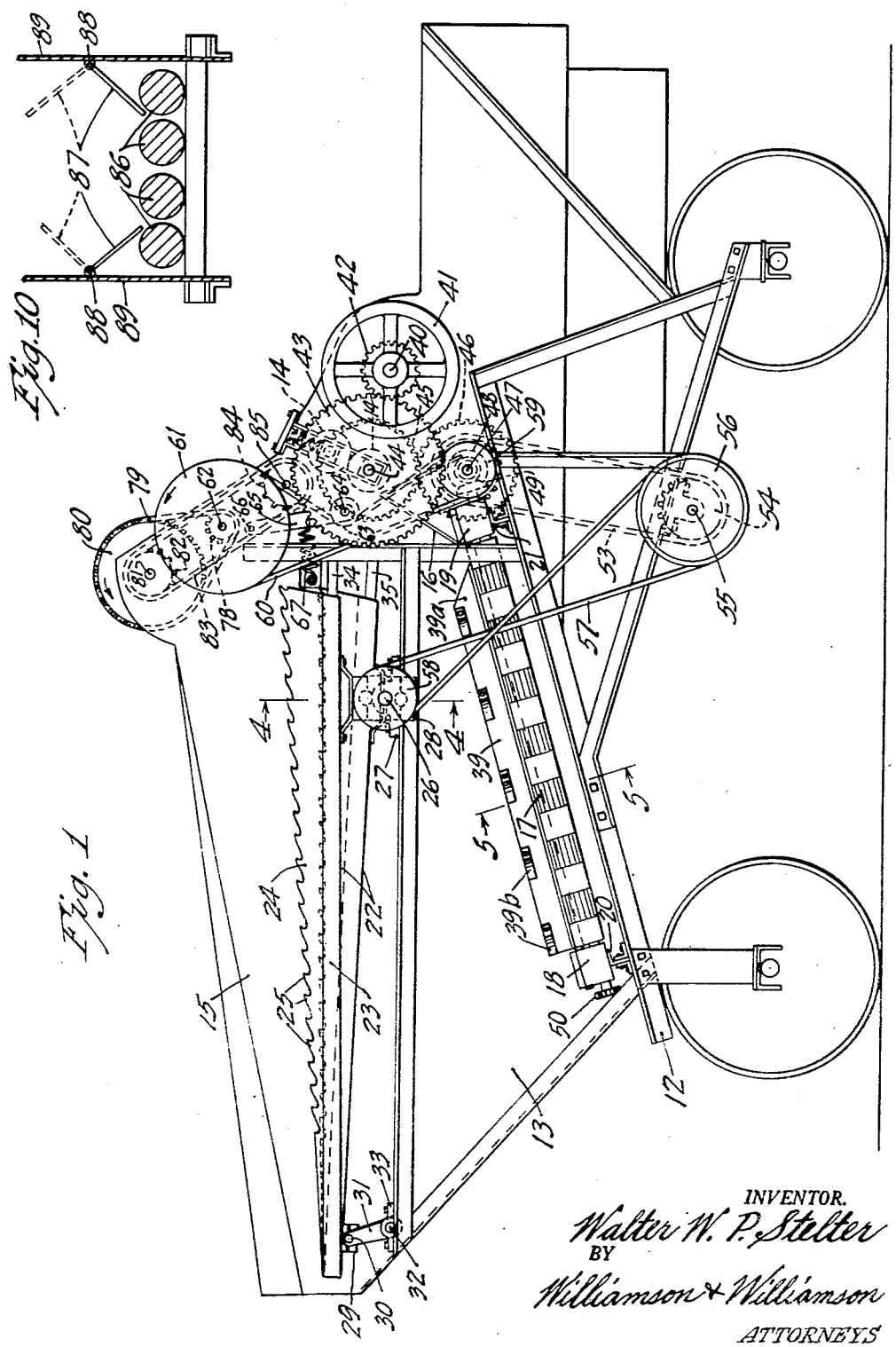
INVENTOR.
Walter W. P. Stelter
BY
Williamson & Williamson
ATTORNEYS April 12, 1955  W. W. P. STELTER  2,705,960
SELF FEEDER FOR CORN SHREDDERS
Filed May 19, 1950  4 Sheets-Sheet 2
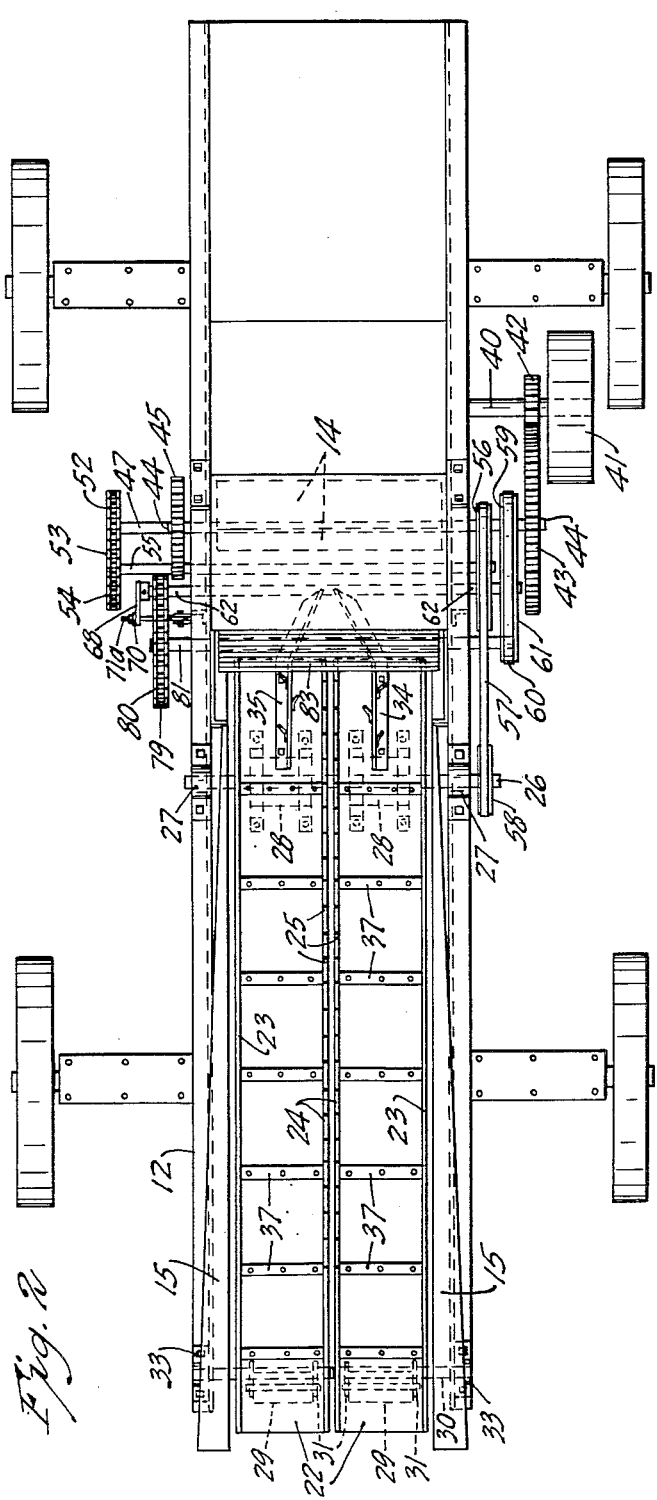
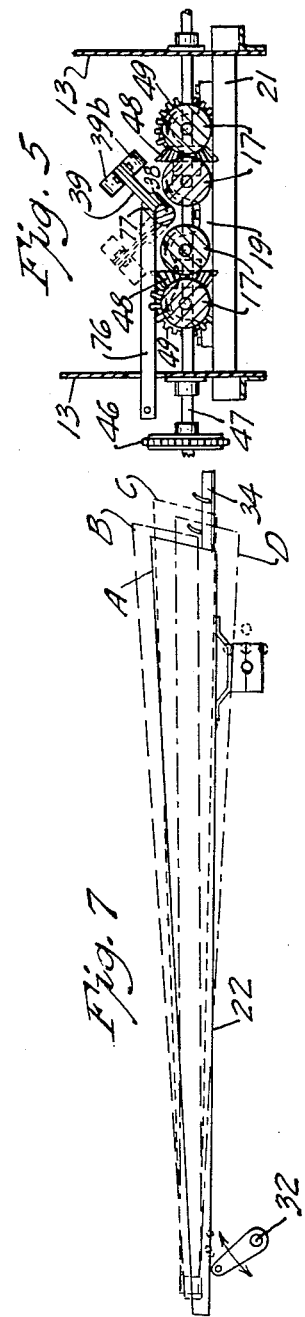
INVENTOR.
Walter W. P. Stelter
BY
Williamson & Williamson
ATTORNEYS

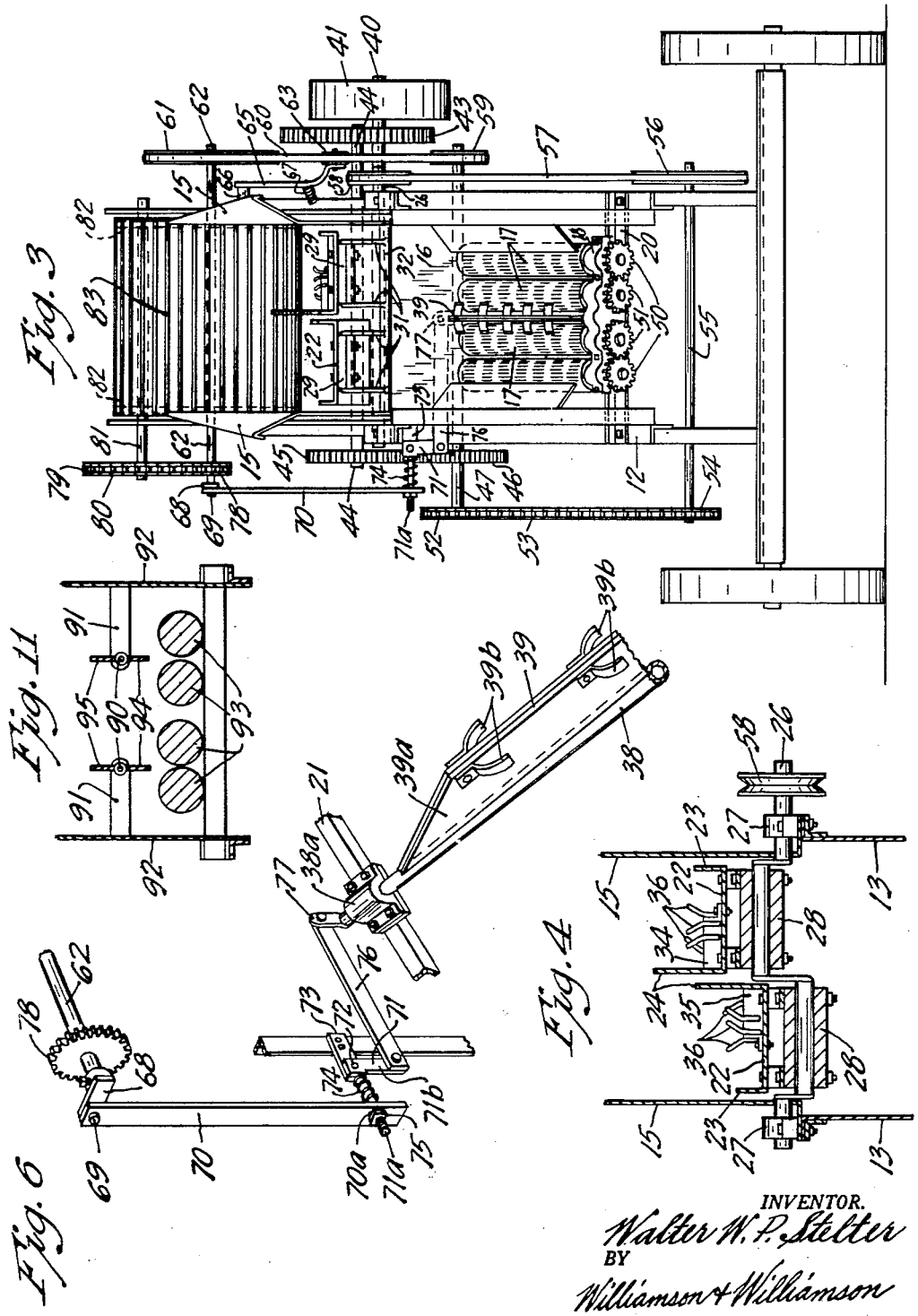

April 12, 1955  W. W. P. STELTER  2,705,960
SELF FEEDER FOR CORN SHREDDERS
Filed May 19, 1950  4 Sheets-Sheet 4
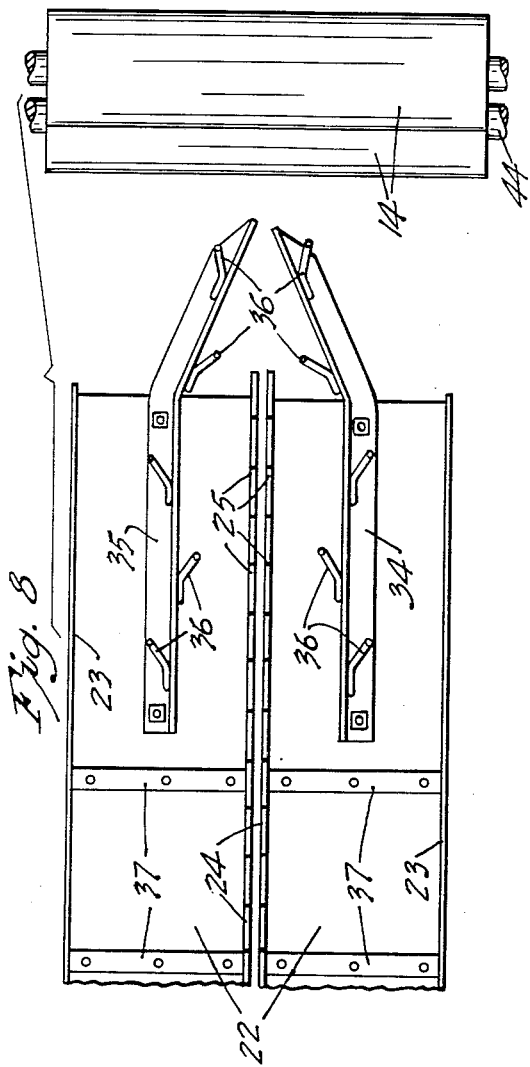
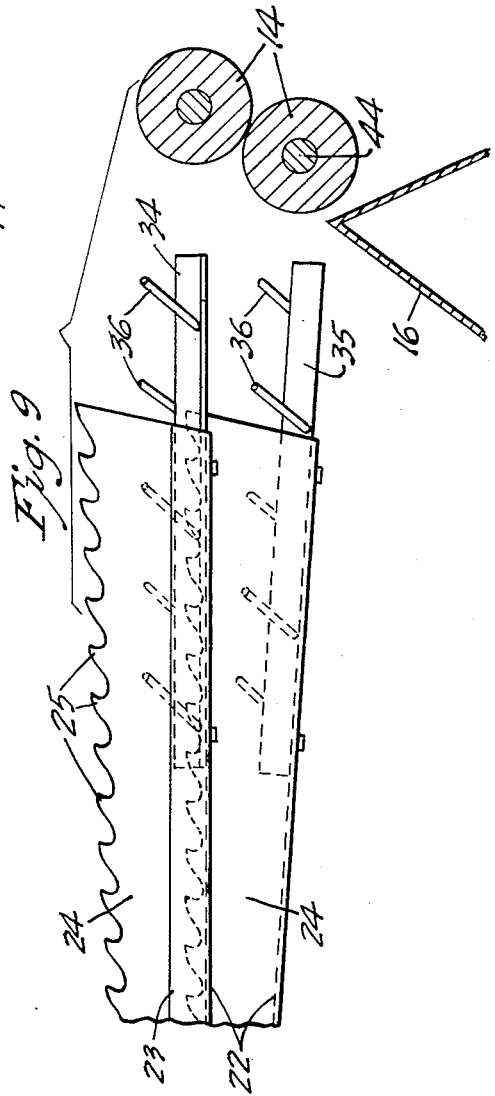
INVENTOR
Walter W. P. Stelter
BY
Williamson & Williamson
ATTORNEYS

United States Patent Office 2,705,960
Patented Apr. 12, 1955

2,705,960

SELF FEEDER FOR CORN SHREDDERS

Walter W. P. Stelter, Echo, Minn.

Application May 19, 1950, Serial No. 163,027

11 Claims. (Cl. 130—5)

This invention relates to corn husking machinery and to self-feeders for corn husking and shredding machines.

In corn husking machinery such as in the ordinary corn picker or in the corn husking and shredding machine, the unhusked corn is fed onto inclined oppositely acting husking rollers having a bight therebetween and these rollers are designed to grab the husks of the unhusked corn and to tear the husks from the ear while moving the ear downwardly to a discharge point at the lower ends of the husking rollers. It sometimes occurs that the unhusked ears are delivered to the husking rollers crosswise or partially crosswise of the length of the husking rollers and on occasion some of the ears so delivered will work downwardly over the length of the rollers without being aligned in the bight between the rollers and without the husks being caught by the rollers and torn from the ears. Also, in the ordinary corn husking machine it is found that some of the ears, although they are properly aligned in the bight between the husking rollers will traverse the husking rollers with only portions of the husks being caught and certain of these ears delivered from the machine will only be partially husked, due principally to the fact that the same portions of the surfaces of the ears are exposed to the action of the husking rollers throughout the entire length of the rollers.

The construction shown in my United States Patent No. 2,440,835, issued May 4, 1948, entitled "Feed Control for Corn Shredders" disclosed the use of flexible jostlers which were mounted to overlie the husking rollers, and these flexible jostlers were agitated by the crank action of overlying feed decks so that they would have an oscillatory movement to and from the rollers and they would also, due to their flexibility and the natural shake that is imparted to a machine such as a corn shredder or other corn husking machine, have some lateral swinging movement relative to the husking rollers. While the jostlers disclosed in my said previous patent greatly increased the efficiency of the husking action of the husking rollers through the jostling of the ears as they worked over the husking rollers, I have found that even more efficient husking action can be secured by the employment of jostlers which are extended longitudinally of the husking rollers and which are positively oscillated so as to work back and forth sufficiently across the opposed rollers as to cause engagement between these jostlers and the ears of corn working downwardly over the inclined husking rollers.

It is an object of this invention, therefore, to provide novel and improved means of simple and inexpensive construction which will jostle the ears of corn as the unhusked ears work over the husking rollers of a corn husking machine through a positive oscillatory movement imparted to the jostlers transversely of the husking rollers.

Another object is to provide novel jostling means for jostling the ears of corn working over the husking rollers which will tend to cause the alignment of unhusked ears with the bight between the husking rollers and which will a times cause the ears to be carried out of engagement with one or the other of the opposed husking rollers permitting turning movement of the unhusked ear by only one of the rollers, thereby presenting at different times different surfaces of the unhusked ears to the action of the husking rollers and increasing the efficiency of the husking action.

In earlier United States patents issued to me, such as Patent No. 2,016,910, issued October 8, 1935, entitled "Feeder for Corn Shredders and the Like," Patent No. 2,085,174, issued June 29, 1937, entitled "Feeder for Corn Shredders and the Like," Patent No. 2,202,540, issued May 28, 1940, entitled "Corn Husking Machine," and Patent No. 2,440,835, issued May 4, 1948, entitled "Feed Control for Corn Shredders," the feed decks by which the corn was advanced to the snapping rollers of the machine and the bridging arms which were secured to the forward ends of these decks and which ran to points in contiguity with the snapping rollers were gyrated upwardly, forwardly, and downwardly consecutively, and each deck was mounted adjacent its forward and rear end on a rotating crank shaft. In such machines, the bundles of corn bound by cords are normally thrown onto the rear portions of the decks and the bands are cut and the material is advanced to the snapping rollers, the material working between sideboards forwardly to the snapping rollers and spreading out longitudinally of the decks, particularly toward the forward ends of the decks. It has been found that while the gyrating movement of the forward ends of the decks and of the bridging arms in order upwardly, forwardly and downwardly consecutively relative to the snapping rollers is requisite to prevent clogging of the machine, that particularly in machines employing only two decks and to a less extent in machines employing three or more decks, there is a tendency for the bundles and corn as thrown onto the rear portions of the deck to be tossed by the gyrating action, sometimes causing bundles or portions of bundles to be thrown over the rear ends of the decks or over the protecting sides. I have found, therefore, that particularly in a two-deck feeder and to a less extent in a feeder having more than two decks, it is desirable to reduce the violence of the gyration of the rear portions of the decks while still retaining the same type of gyration of the forward ends of the decks and of the bridging arms as in my previously described patented constructions.

It is an another object of this invention, therefore, to provide in a feeder for corn shredders and similar machines, differently timed gyrating decks which may or may not carry bridging arms at their forward ends extending toward the snapping rollers, the forward ends of the decks acting to gyrate the material in order upwardly, forwardly and downwardly consecutively in contiguity with the snapping rollers, and the rear portion of the decks either having an oscillatory movement or a gryatory movement less violent than the forward portions of the decks whereby tossing of the bundles as they are pitched onto the rear portions of the decks is eliminated.

Another object is to simplify and cheapen the deck construction disclosed in my previously granted patents.

In self-feeders for corn shredders of the type described in my previously issued patents above identified, the bridging arms are carried directly forwardly from the decks toward the snapping rollers and I have found that particularly in a two-deck machine and to a lesser extent in a machine having more than two decks, there is some tendency for the bridging arms to work the material toward the sides of the machine, sometimes causing the material to clog between the bridging arms and the side walls immediately adjacent the snapping rollers of the machine. It is another object of the present invention to so construct the bridging arms as to prevent this clogging action.

The objects and advantages of the invention will more fully appear from the following description made in connection with the accompanying drawings, wherein like reference characters refer to the same or similar parts throughout the several views, and in which:

Fig. 1 is a view in side elevation of a corn husking and shredding machine embodying the invention, the near side paneling and the near sideboard of the machine not being shown to better illustrate the parts;

Fig. 2 is a plan view of the same machine;

Fig. 3 is a view in end elevation of the machine looking toward the rear end of the machine as viewed from the left of Figs. 1 and 2;

Fig. 4 is a vertical section of the machine taken substantially on the line 4—4 of Fig. 1 as indicated by the arrows, the parts forward of the decks and bridging arms not being shown;

Fig. 5 is a section taken substantially on the line 5—5 of Fig. 1 as indicated by the arrows, showing certain of the parts;

Fig. 6 is a perspective view in enlarged scale showing the drive for the jostler;

Fig. 7 is a view in side elevation showing one of the decks and certain parts of the mounting therefor in full lines, certain of the different positions that the deck will assume successively being illustrated in dotted lines;

Fig. 8 is a plan view in enlarged scale showing the forward portions of the two decks, together with the bridging arms connected thereto;

Fig. 9 is a view in side elevation of these same parts as associated with the snapping rollers;

Fig. 10 is a view generally similar to Fig. 5 but illustrating a slightly different type of jostler that may be employed; and Fig. 11 is a similar view illustrating still a different form of jostler.

Referring first to Figs. 1–9 inclusive, there is shown in the drawings portions of a corn husking and shredding machine. This machine includes a wheeled frame 12, the forward end of which will be considered to be the end shown at the right of Fig. 1, this frame having side panels 13 secured thereto, only the left side panel being shown in Fig. 1 of the drawings. The paneled frame 12 is open at its upper side from the rear end of the frame forwardly to a point adjacent spring pressed snapping rollers 14 which rollers extend transversely between the two sides of the machine. Rising from the side paneling 13 of the machine at the two sides of the opening provided are sideboards 15 which form the side walls of a trough running from the rear end of the machine to a point adjacent snapping rollers 14. A guide plate 16 inclines diagonally downwardly and rearwardly from the snapping rollers 14 to deliver the unhusked ears of corn pinched off the stalks by the snapping rollers downwardly to the forward end portions of two pair of oppositely acting inclined husking rollers 17 journaled in suitable bearings 18 and 19 respectively carried by cross bars 20 and 21 carried by the lower portion of the frame 12. No attempt is made to show the cutting knives of the machine which are employed for cutting the stalks forwardly of the snapping rollers 14 after the stalks pass between the snapping rollers.

Between the two sideboards 15 there are located below the upper edges of these boards a pair of feed decks 22, these decks extending from adjacent the rear end of the machine forwardly to points spaced somewhat rearwardly from the two snapping rollers 14. These decks form the bottom of the trough, the sides of which are formed by the sideboards 15. The two decks 22 are located in side-by-side relation and each deck has an upwardly turned short outer flange 23 and an upwardly turned inner flange 24. The upper edges of the flanges 24 are serrated to form forwardly and upwardly inclined teeth 25 which have the function of working into the bundles of corn thrown onto the decks 22 and of catching and breaking the cords carrying these bundles. The toothed flanges 24 also have the function of distributing the corn stalks after the cords have been cut generally longitudinally of the decks and they also act to advance the material along the decks toward the snapping rollers 14. Preferably, the inner flanges 24 of the decks are of greater height adjacent the forward ends of the decks than adjacent the rear ends thereof, the serrated edges 25 accordingly being inclined somewhat upwardly and forwardly from the rear portions of the decks.

Below the forward portions of the decks 22 a double-throw crank shaft 26 is mounted in suitable bearings 27 carried by the upper portions of the frame 12. Each deck carries a suitable depending bearing 28 through which one crank portion of the crank shaft extends and the two crank portions of the crank shaft are diametrically opposed to each other. The crank shaft 26 will be rotated in a clockwise direction as viewed in Fig. 1 and through the medium of the crank shaft the forward portions of the decks 22 will be given a differently timed gyratory movement in a direction first upwardly, then forwardly, then downwardly, and then rearwardly consecutively in respect to the snapping rollers 14. This movement is highly important to cause proper feed of the material forwardly to the snapping rollers 14. The rear portions of the two decks 22 carry depending bearings 29 respectively receiving pivot pins 30 connected to swinging arms 31 mounted for independent swinging movement on a cross shaft 32 extending between and carried by brackets 33 mounted at the rear portions of the upper members of frame 12. It will accordingly be seen that the rear ends of the decks 22 are mounted for oscillating swinging movement, this movement being accomplished solely through the rotation of the crank shaft 26. In Fig. 7 one of the decks 22 is shown in full lines in its rear central position, this position being indicated by the letter A. As the crank shaft 26 is revolved in a clockwise direction as viewed in Fig. 7, the deck 22 moves upwardly and forwardly to its highest position shown in dotted lines and designated B as shown in Fig. 7. The deck then moves forwardly and downwardly to its forward central position designated C in Fig. 7 and it then moves downwardly and rearwardly to its lowest position designated D in Fig. 7. While the forward end of the deck is being gyrated in this manner, the rear end of the deck oscillates relative to the center of the shaft 32 first upwardly and forwardly from position A to position B, then downwardly and forwardly from position B to position C, then returns upwardly and rearwardly from position C to position D and thence downwardly and rearwardly from position D to position A, this oscillation being indicated by the double headed arrow shown adjacent the left end portion of Fig. 7.

Each deck 22 carries adjacent its forward end a bridging arm, the two bridging arms shown generally corresponding in construction but being made in rights and lefts and being designated respectively by the numbers 34 and 35. These bridging arms run forwardly from the forward ends of the decks to points contiguous to the two snapping rollers 14 and, of course, these bridging arms have the same gyratory movement as the forward end portions of the two decks. The bridging arms 34 and 35 forwardly of the forward ends of the decks 22 are bent to extend diagonally inwardly as best shown in Fig. 8, and preferably the forward ends of the bridging arms are chamfered as shown, the inner tips of the arms 34 on the two decks being located in closed transversely spaced relation. These bridging arms 34 and 35 may be of angular formation in section, and in staggered relation throughout the length of the bridging arms upwardly and forwardly projecting fingers 36 are secured to the bridging arms. The bridging arms 34 and 35 have the function of gyrating the material at a point in contiguity with the snapping rollers 14 first upwardly, then forwardly, then downwardly, and of causing the material to ride upwardly and downwardly relative to the bight between the snapping rollers 14, thereby permitting efficient feed of the material to the snapping rollers without jamming up or clogging adjacent the snapping rollers. The inward inclination of the forward portions of the bridging arms 34 and 35 prevents the clogging or wedging of the material as it feeds forwardly between the outer sides of the bridging arms and the sideboards 15. In other words, as contrasted with straight-forwardly extending bridging arms such as employed in my previous patented constructions heretofore referred to, the bridging arms of my present invention being inclined centrally from the points where the bridging arms are connected to the decks allow for increasingly greater distances between succeeding forward portions of the bridging arms and sideboards 15 so that any pressure tending to cause the jamming and clogging of the material between the outer sides of the bridging arms and sideboards 15 is relieved, thereby preventing clogging of the machine at this point. Of course, the forwardly and upwardly inclined fingers 36 assist in feeding the material forwardly to the snapping rollers 14. The decks 22 are equipped with upwardly and forwardly inclined cross cleats 37 or equivalent structure to also assist in feeding the material forwardly over the decks during the gyration of the forward portions of the decks.

As best seen in Figs. 1, 3, 5 and 6, in the particular machine illustrated, the husking rollers 17 are disposed in transversely spaced oppositely acting pairs, the various rollers turning in the direction indicated by the arrows in Fig. 5 and there accordingly being a bight formed between the two left hand rollers 17 as shown in Fig. 5 and another bight formed between the two right hand rollers as shown in Fig. 5. As the two inner rollers 17 are spaced transversely somewhat from each other, there is room between these two rollers for the mounting of a jostler shaft 38 and this shaft which extends generally parallel to the longitudinal rotational axes of the husking rollers 17 is journaled in suitable bearings 38a carried by the cross bars 20 and 21. The rotating axis of the shaft 38 is about level with the upper surfaces of the various husking rollers 17 as shown in Fig. 5. The jostler shaft 38 carries a jostler 39 which consists of an elongated plate 39a to the upper portions of which outwardly and downwardly extending spring fingers 39b are secured. Also, the upper end of the plate 39a is beveled as shown in Fig. 6 for the purpose of preventing an upper corner of the plate from obstructing the free flow of ears of corn downwardly to the bights between the pairs of snapping rollers 17. The jostler 39 has an oscillating movement back and forth between the full line position shown in Fig. 5 and the dotted line position there shown and during this movement certain portions of the jostler 39 will be carried partially across the bights between the pairs of husking rollers 17 causing portions of the jostler to strike and move or jostle ears of corn which may be disposed crosswise or partially crosswise of the husking rollers 17 and to also cause portions of the jostler to engage ears which are aligned with the husking rollers 17 and which are held in the bights between the adjacent rollers to carry these ears temporarily out of engagement with one of the pair of rollers between which they are received, allowing the other roller to solely engage the ear and rotate the ear to a new position, causing a different periphery of its surface to be caught in the bight.

When the jostler 39 oscillates back and forth it acts to positively align any stalks and/or trash which may be deposited thereupon from above in conjunction with the unhusked ears. The transverse oscillation of the jostler will quickly cause any stalk deposited cross-wise thereof (and consequently cross-wise of the rollers) to be turned and aligned with the longitudinal axes of the rollers so that the rollers may readily engage such stalks and carry them therebetween. I have found in operation that seldom more than one complete oscillation is required to cause any given number of stalks deposited thereacross to be aligned with the rollers. Thus it is never necessary for the operator of the husker to waste valuable time and undergo a hazardous operation by attempting to dislodge and re-arrange stalks so that the rollers may engage the same and draw them downwardly between each other.

While the drives for the various moving parts of the machine may be variably arranged, in the illustrated embodiment there is journaled in the side walls 13 of the machine a main drive shaft 40. This shaft carries a bull-wheel 41 at the right side of the machine which may be driven as by a suitable belt, not illustrated, from a tractor. The shaft 40 carries a pinion 42 at the right side of the machine meshing with and driving a large gear 43 carried at the right end portion of a lower snapping roller shaft 44 extending transversely across the machine and journaled in the walls of the machine. The lower snapping roller shaft 44 at the left side of the machine carries a pinion 45 meshing with a gear 46 carried at the left side of the machine by a husking roller drive shaft 47 which extends transversely of the machine and is journaled in the side walls thereof. The husking roller drive shaft 47 carries as best shown in Fig. 5 a pair of beveled pinions 48. The beveled pinion 48 adjacent the left side of the machine meshes with the right side portion of a beveled gear 49 carried by the shaft of the roller 17 most closely adjacent the left side of the machine. The beveled pinion 48 most closely adjacent the right side of the machine meshes with the left hand portion of a beveled gear 49 carried by the husking roller 17 most closely adjacent the right side of the machine. As best shown in Fig. 3, the lower ends of the two outer husking rollers 17 have pintle portions carrying pinions 50 which mesh with and drive gears 51 carried by the lower ends of the shafts of the inner rollers 17. The rotation of the bull-wheel 41 is such that the four husking rollers 17 will be driven in the direction indicated by the arrows, Fig. 5.

The husking roller drive shaft 47 carries at its left end a sprocket 52 over which a sprocket chain 53 is trained, this sprocket chain in turn driving a sprocket 54 carried by a lower countershaft 55, the lower countershaft 55 extending transversely of the machine and being journaled in suitable bearings carried by the underpart of the frame 12 as is best seen in Fig. 1 and in Fig. 2. The lower countershaft 55 at the right side of the machine carries a pulley 56 over which a cross belt 57 travels, this cross belt also running over a pulley 58 carried at the right end of the crank shaft 26 which gyrates the forward ends of the decks 22. Through this driving relation the crank shaft 26 is caused to rotate in a clockwise direction as viewed in Fig. 1.

The husking roller drive shaft 47 at its right side also carries a pulley 59 over which a belt 60 travels, this belt running over a large pulley 61 carried at the right side of the machine by a jostler drive shaft 62. The belt 60 also runs rearwardly over a belt-tightener pulley 63 located at the right side of the machine and journaled on a stub shaft 64 carried by an arm 65 pivoted at 66 to a suitable portion of the frame. The arm 65 is urged rearwardly to carry the pulley 63 into belt-tightening relation with the belt 60 by a tension spring 67 secured at one end to the arm 65 and at its other end to the right hand sideboard 15 rearwardly of the belt-tightening pulley 63. The jostler drive shaft 62 extends transversely of the machine and is journaled in the sideboards 15. It carries at its left end a short crank arm 68 as is best seen in Fig. 6 and this arm carries a crank pin 69 which forms a pivot for the upper end of a pitman 70. The lower end of the pitman 70 has near its lower end an enlarged opening 70a receiving loosely therein a stud-like arm 71a of a bell crank lever 71. The bell crank lever 71 is mounted for swinging movement on a pivot 72 carried by a bracket 73 attached to one of the upwardly extending members of the frame 12 and a coiled tension spring 74 surrounding the stud-like arm 71a of the bell crank lever 71 bears at one end against the central head-like portion of the bell crank lever 71 and the inner side of the pitman 70. A nut 75 is carried at the outer side of the pitman 70 by the stud-like arm 71a of the bell crank lever and through adjustment of this nut inwardly or outwardly on the stud-like arm 71a of the bell crank lever it is possible to vary the effective lever arm of the stud-like arm of the bell crank lever and as will presently appear thereby vary the angle of oscillation of the jostler shaft 38 to control the arc through which the upper edge of the jostler 39 will be swung. The bell crank lever 71 has another downwardly extending arm 71b which is pivotally connected to a link 76 which extends through a slot in the left side wall of the machine and runs inwardly and is pivotally connected at its inner end to an arm 77 carried by the upper end of the jostler shaft 38. With this arrangement, it will be seen that as the shaft 62 is rotated, the lower end of the pitman 70 will be reciprocated, imparting a swinging movement to the bell crank lever 71 thereby causing oscillation of the inner end of the link 76 and oscillating the arm 77, thereby oscillating the jostler shaft 38 and the jostler 39 carried thereby. If the effective length of the stud-like arm 71a of the bell crank lever 71 is increased or reduced by respectively loosening or tightening the nut 75, the arc through which the jostler 39 is oscillated will be similarly increased or reduced. Of course, the spring 74 holds the lower end of the pitman 70 tight against the nut 75 as the nut is variably adjusted. It will thus be seen that the stroke of oscillation of the jostler 39 can be varied and it is sometimes desirable to vary the stroke of oscillation depending to a large extent on the size of the ears of corn which are fed to the husking rollers 17.

The jostler driving shaft 62 at the left side of the machine and as perhaps best seen in Fig. 1 carries a sprocket 78 over which a sprocket chain 79 runs, this sprocket chain also running over a larger sprocket 80 carried at the left side of the machine by a retarder conveyor shaft 81 which extends transversely of the machine and is journaled in the upper forward portions of the two sideboards 15. The retarder chain conveyor shaft 81 between the two sideboards 15 carries sprockets 82 over which run the chains of a chain and slat conveyor 83 which is employed as a retarder to retard the upper run of the strata of material fed to the snapping rollers 14. The slat and chain conveyor 83 runs over sprockets 84 carried by a lower cross shaft 85 journaled in the sideboards 15 just above the upper snapping rollers 14. The conveyor or retarder 83, while its lower run is driven downwardly and forwardly, is driven at a much slower speed than the speed of advancing movement of the material as caused by the decks 22, and if the material carried forwardly by the decks 22 and the bridging arms 34 and 35 reaches to a certain height the upper portion of this material will strike the rear and lower run of the conveyor 83 and will be advanced more slowly to the snapping rollers than the lower run of the material, while being worked downwardly toward the snapping rollers.

Attention should perhaps be called to the fact that as best seen in Figs. 1 and 3, the two sideboards 15 above the decks 22 incline upwardly and forwardly at their upper edges which permits of ease in pitching bundles of corn stalks onto the rear portions of the decks 22 between the sideboards 15 and at the same time permits of the confining of the material between the two sideboards as the forward portions of the material are rather violently gyrated through the rotational movement of the forward portions of the decks 22. Also, to permit of easier reception of the corn bundles to the rear portions of the decks, the rear upper portions of the decks are turned outwardly as is best shown in Figs. 2 and 3.

Referring now to Fig. 10, there is there shown portions of a machine of somewhat narrower construction than that shown in Figs. 1-9, and wherein the two central husking rollers which are numbered 86 are more closely disposed than in the previously described construction and wherein there is very little room to mount a jostling shaft between the two inner rollers. In this construction shown in Fig. 10 a pair of jostlers 87 are provided carried by shafts 88 running parallel to the axes of the rollers 86 and journaled in suitable brackets carried by the sides 89 of the machine. Proper driving connection will be made to the two jostler shafts 88 causing oscillation of these shafts and the movement of the lower portions of the jostlers 87 across or partially across the bights between the oppositely acting husking rollers 86.

Referring to Fig. 11, an alternative type of jostler construction is shown wherein jostler shafts 90 are journaled in brackets 91 carried by the sides 92 of the machine so that the jostler shafts 90 extend parallel to the axes of the pairs of oppositely acting husking rollers 93. The shafts 90 carry jostlers 94 which project downwardly from the shafts 90 to overlie the bights between the opposed husking rollers and it is assumed that a suitable driving mechanism will be provided to produce oscillation of the two shafts 90. The shafts 90 also carry upwardly projecting plates or arms 95 which, of course, swing with the jostlers 94 and these upper plates are of assistance in working the ears which are fed to the husking rollers 93 so that the ears align generally with the husking rollers as they are carried into the bights between the rollers.

It will be seen that a highly effective mechanism has been provided for the purposes intended. While the jostlers are shown as applied to a corn husking and shredding machine, these jostlers may be employed in connection with any type of husking machine such as the ordinary corn picker and will be highly effective for use thereon.

It will, of course, be understood that various changes may be made in the form, details, arrangement and proportions of the various parts without departure from the scope of the present invention, which, generally stated, consists in the matter shown, and described, and set forth in the appended claims.

What I claim is:

1. In combination with a pair of substantially parallel laterally cooperating husking rolls, an ear jostling and stalk feeding means, said means comprising an elongated plate-like member, said member being pivoted along a longitudinal edge about an axis which is substantially parallel to the axes of said husking rolls and spaced laterally with respect thereto, means connected to said plate-like member for oscillating the same about said axis whereby said plate-like member will cause stalks to be fed between said rolls, said plate-like member being provided along a side thereof adjacent a longitudinal edge opposed to said pivot axis with ear-engaging means whereby said ear-engaging means will cause said ears to engage one of said rolls with more force than it engages the other of said rolls causing said ear to rotate to effect complete husking.

2. The structure defined in claim 1, wherein said plate-like member extends upwardly from its longitudinal edge along which it pivots.

3. The structure defined in claim 1, wherein the axis of pivot of said plate-like member is disposed above the axis of at least one of said rolls.

4. In combination with a pair of substantially parallel laterally cooperating husking rolls, an ear jostling and stalk feeding means, said means comprising an elongated plate-like member, said member being pivoted along a longitudinal edge about an axis which is substantially parallel to the axes of said husking rolls and spaced laterally with respect thereto, means connected to said plate-like member for oscillating the same about said axis whereby said plate-like will cause stalks to be fed between said rolls, said plate-like member being provided along a side thereof adjacent a longitudinal edge opposed to said pivot axis with ear-engaging means whereby said ear-engaging means will cause said ears to engage one of said rolls with more force than it engages the other of said rolls causing said ear to rotate to effect complete husking, said ear-engaging means including a plurality of spring arms carried by said plate-like member and extending laterally outwardly from opposite sides thereof.

5. In combination with a pair of substantially parallel laterally cooperating husking rolls, an ear jostling and stalk feeding means, said means comprising an elongated plate-like member, said member being pivoted along a longitudinal edge about an axis which is substantially parallel to the axes of said husking rolls and spaced laterally with respect thereto, means connected to said plate-like member for oscillating the same about said axis whereby said plate-like member will cause stalks to be fed between said rolls, said plate-like member being provided along a side thereof adjacent a longitudinal edge opposed to said pivot axis with ear-engaging means whereby said ear-engaging means will cause said ears to engage one of said rolls with more force than it engages the other of said rolls causing said ear to rotate to effect complete husking, said ear-engaging means including a plurality of spring arms carried by said plate-like member and spaced longitudinally thereof and extending laterally outwardly therefrom and terminating in free end portions.

6. In combination with two adjacent pairs of substantially parallel laterally cooperating husking rolls, an ear jostling and stalk feeding means mounted between said two pairs of rolls, said means comprising an elongated plate-like member, said member being pivoted along a longitudinal edge about an axis which is substantially parallel to the axes of said husking rolls and spaced laterally with respect thereto, means connected to said plate-like member for oscillating the same about said axis whereby said plate-like member will cause stalks to be fed between said cooperating rolls, said plate-like member being provided along a side thereof adjacent a longitudinal edge opposed to said pivot axis with ear-engaging means whereby said ear-engaging means will cause said ears to engage one of said rolls with more force than it engages the other of said rolls, causing said ear to rotate to effect complete husking.

7. The structure defined in claim 6, wherein the axis of pivot of said plate-like member is adjacent to the axis of at least one roll of each of said pair of rolls.

8. The structure defined in claim 6 wherein said plate-like member extends upwardly from its axis of pivot.

9. The structure defined in claim 6, wherein the axis of pivot of said plate-like member lies between said adjacent pairs of rolls and said plate-like member extends upwardly therefrom.

10. In combination with two adjacent pairs of substantially parallel laterally cooperating husking rolls, an ear jostling and stalk feeding means mounted between said two pairs of rolls, said means comprising an elongated plate-like member, said member being pivoted along a longitudinal edge about an axis which is substantially parallel to the axes of said husking rolls and spaced laterally with respect thereto, means connected to said plate-like member for oscillating the same about said axis whereby said plate-like member will cause stalks to be fed between said cooperating rolls, said plate-like member being provided along a side thereof adjacent a longitudinal edge opposed to said pivot axis with ear-engaging means whereby said ear-engaging means will cause said ears to engage one of said rolls with more force than it engages the other of said rolls causing said ear to rotate to effect complete husking, said ear-engaging means including a plurality of spring arms carried by said plate-like member and extending laterally outwardly from opposite sides thereof.

11. In combination with two adjacent pairs of substantially parallel laterally cooperating husking rolls, an ear jostling and stalk feeding means mounted between said two pairs of rolls, said means comprising an elongated plate-like member, said member being pivoted along a longitudinal edge about an axis which is substantially parallel to the axes of said husking rolls and spaced laterally with respect thereto, means connected to said plate-like member for oscillating the same about said axis whereby said plate-like member will cause stalks to be fed between said cooperating rolls, said plate-like member being provided along a side thereof adjacent a longitudinal edge opposed to said pivot axis with ear-engaging means whereby said ear-engaging means will cause said ears to engage one of said rolls with more force than it engages the other of said rolls, causing said ear to rotate to effect complete husking, each of said pair of rolls forming a bight therebetween, said ear-engaging means including a plurality of arms carried by said plate-like member and extending laterally outwardly therefrom, said arms oscillating with said plate-member and in so doing, passing across the bight between each pair of rolls.

References Cited in the file of this patent

UNITED STATES PATENTS

| Number | Name | Date |
|---|---|---|
| 106,276 | Philip | Aug. 9, 1870 |
| 644,344 | Van Ness | Feb. 27, 1900 |
| 712,982 | Van Ness | Nov. 4, 1902 |
| 735,308 | Snyder | Aug. 4, 1903 |
| 998,928 | Smolley | July 25, 1911 |
| 1,124,487 | Maull | Jan. 12, 1915 |
| 1,997,630 | Coultas | Apr. 16, 1935 |
| 2,001,351 | Nuttelman | May 14, 1935 |
| 2,202,540 | Stelter | May 28, 1940 |
| 2,317,822 | Stelter | Apr. 27, 1943 |
| 2,329,768 | Kerr | Sept. 21, 1943 |
| 2,431,016 | Andrews | Nov. 18, 1947 |
| 2,440,835 | Stelter | May 4, 1948 |
| 2,538,914 | Rosenthal | Jan. 23, 1951 |
| 2,546,264 | Jones | Mar. 27, 1951 |